United States Patent

Meacher et al.

[15] 3,654,418
[45] Apr. 4, 1972

[54] METHOD AND APPARATUS FOR THE MANUFACTURE OF WIRE RINGS

[72] Inventors: John Wyatt Meacher, Gerrards Cross; David Stanley Pile, Garston, both of England

[73] Assignee: The Westminster Engineering Company Limited, Harrow, Middlesex, England

[22] Filed: Apr. 13, 1970

[21] Appl. No.: 27,805

[30] Foreign Application Priority Data

Apr. 18, 1969 Great Britain..................19,839/69

[52] U.S. Cl..............................219/56, 219/103, 219/161
[51] Int. Cl.........................................................B23k 11/00
[58] Field of Search..................219/56, 101, 103, 158, 161, 219/57, 58

[56] References Cited

UNITED STATES PATENTS

| | | | |
|---|---|---|---|
| 2,967,925 | 1/1961 | Rietsch | 219/101 X |
| 3,514,574 | 5/1970 | Forschler | 219/104 X |
| 3,384,731 | 5/1968 | Draving | 219/161 X |
| 2,149,969 | 1/1939 | Biggert | 219/104 X |
| 990,489 | 4/1911 | Machneale | 219/161 X |

Primary Examiner—J. V. Truhe
Assistant Examiner—Hugh D. Jaeger
Attorney—Stevens, Davis, Miller & Mosher

[57] ABSTRACT

The invention relates to a method and apparatus for the manufacture of wire rings. The Specification discloses a method of manufacturing a wire ring by feeding a length of wire past a first welding electrode and forming said wire to take up a ring shape with a free end having its axis displaced from the axis of the section of said wire passing said first welding electrode. The free end of the wire is clamped to a second welding electrode, the wire passing the first welding electrode is clamped to that electrode and the wire is cut between the electrodes. Relative movement of the electrodes then takes place to bring the free end and the cut end of the wire together with their axes substantially aligned and the free end and the cut end are then butt welded together. This method may be performed by a butt welding attachment designed for fitting to existing wire ring forming machines or a wire ring forming machine may be built to include necessary welding apparatus. The invention enables wire rings to be formed without the need for a handling operation between the ring forming and the welding steps.

9 Claims, 3 Drawing Figures

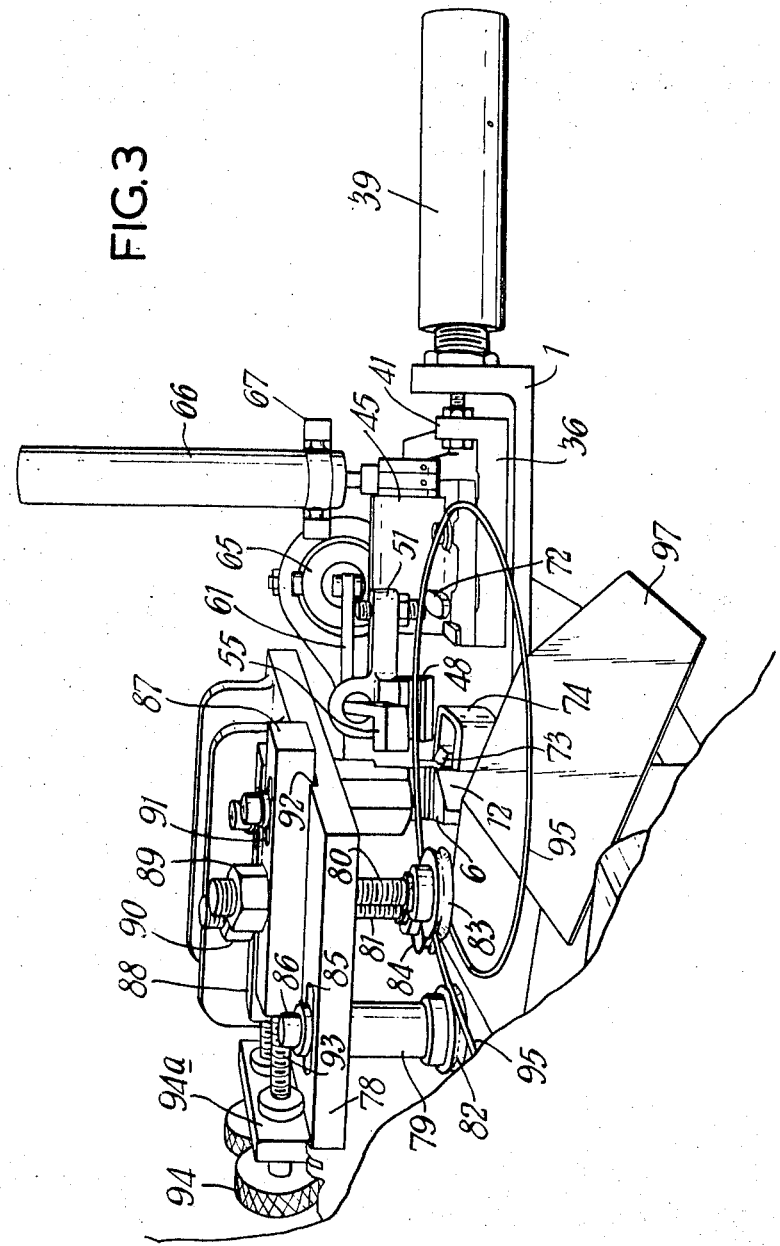

METHOD AND APPARATUS FOR THE MANUFACTURE OF WIRE RINGS

This invention relates to a method and apparatus for the manufacture of wire rings.

In the conventional manufacture of wire rings an open ring is first formed by force feeding wire through a series of three rollers. Engagement of the wire with the rollers forms the wire into a ring, the radius of which can be adjusted by adjusting the rollers. When sufficient wire has been fed through the rollers to form the required ring, the wire is cut. The open ring is then removed from the forming machine and the two free ends of wire are clamped to the two electrodes of a butt welding machine, and are welded together to form the required closed ring. This manufacture entails a handling operation in transferring the rings from the forming machine to the welding machine.

The object of this invention is to eliminate this handling operation and to provide a method and apparatus whereby the formed rings may be butt welded in situ on the forming machine.

According to the invention a method of manufacturing a wire ring comprises the steps of feeding a continuous length of wire past a first welding electrode, forming the length to take up a ring shape with the free end of the wire having its axis displaced from the axis of the section of the wire passing the first electrode, clamping the free end of the wire to a second welding electrode located adjacent to the first electrode, clamping the wire to the first electrode, cutting the wire adjacent to the electrodes, causing relative movement of the electrodes to bring the free end and the cut end of the wire together with their axes substantially aligned, and butt welding the free end and the cut end together.

By the method of the invention the wire ring is welded while still in position on the forming machine, and any intermediate handling operation between forming and welding is eliminated.

Preferably during feeding of the wire past the first welding electrode, a movable cutter blade is moved from a withdrawn position clear of the electrodes to an intermediate position, and feeding of the wire continues until the free end of the ring of wire moves into contact with the movable cutter blade in its intermediate position, whereupon feeding of the wire is stopped.

This ensures accuracy in the length of wire fed, and thus assists in obtaining accurately the desired welding gap between the free and the cut ends of the wire.

Preferably the wire is cut by movement of the movable cutter blade from the intermediate position to a cutting position wherein the movable cutter blade co-operates with a fixed cutter blade to cut the wire.

Conveniently the cutter blade is moved upwardly to its intermediate position from its withdrawn position below the two electrodes, and is moved further upwardly to the cutting position from its intermediate position, and the first electrode is clamped to the wire before the further upward movement of the movable cutter blade so that the first electrode moves upwardly with the wire and the movable cutter blade while the second electrode holds the free end of the wire in a fixed position below the fixed cutter blade.

The second electrode is preferably fixed and the first electrode movable relative to the second electrode by a pivotal movement about a horizontal axis. It will be appreciated, of course, that constructions are possible wherein the first electrode is fixed and the second movable, or wherein both electrodes are movable. Furthermore, it is not essential for the electrodes to be capable of relative pivotal movement, and relative linear movement may alternatively be used. The relative movement need not be in a vertical plane.

The method of the invention may be carried out by a welding attachment secured to an existing wire ring forming machine, or alternatively a ring forming machine may be built to include the welding components.

According to another feature of the invention a butt welding attachment for a wire ring forming machine comprises first and second welding electrodes located side by side, first and second clamping means for clamping wire respectively to the first and second electrodes, means for causing relative movement of the electrodes between positions wherein the axes of those sections of the wire held by the electrodes are not aligned and a welding position wherein these axes are aligned, and means for cutting wire between the two electrodes.

A wire ring forming machine according to the invention comprises a wire feed mechanism, a first welding electrode past which wire may be fed, means for forming a length of wire to take up a ring shape with a free end of the wire having its axis displaced from the axis of the section of the wire passing the first electrode, a second welding electrode located adjacent to the first electrode, first and second clamping means for clamping wire to the first and second electrodes respectively, means for causing relative movement of the electrodes between positions wherein the axes of those sections of the wire held by the electrodes are not aligned, and a welding position wherein these axes are aligned, and means for cutting the wire between the two electrodes.

A specific embodiment of the invention will now be described in more detail by way of example only with reference to the accompanying drawings in which:

FIG. 3 is a schematic view of part of a wire ring forming machine according to the invention.

Figure 1:
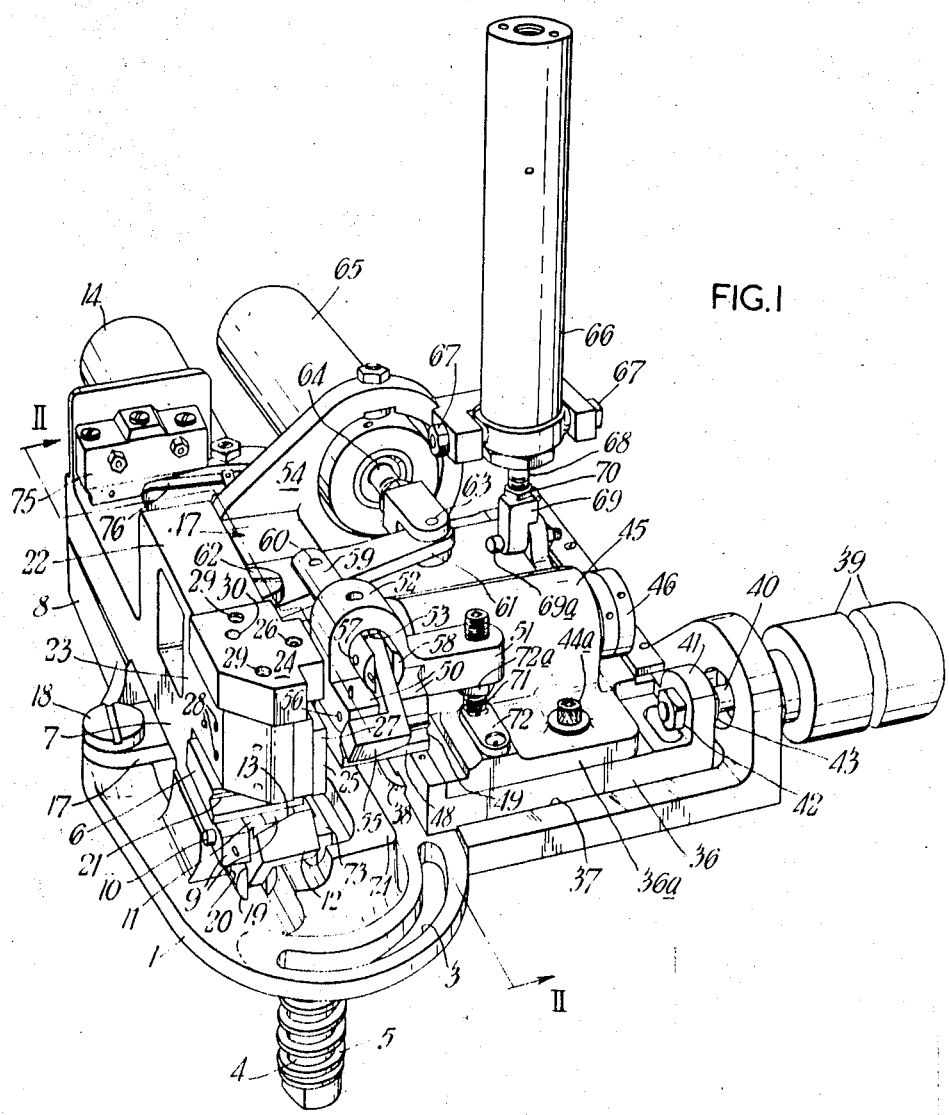
FIG. 1 is a perspective view of a butt welding attachment for a wire ring forming machine.

The attachment comprises a base plate 1 having a depending boss 2 which may be located in a receiving bore formed on the wire ring forming machine. An arcuate slot 3 is formed in the base plate 1 and a locking bolt (not shown) may be passed through the slot 3 and screwed into a tapped bore on the forming machine. The base plate can thus be set at any one of a number of angular positions relative to the forming machine. A plunger 4 passes through the boss 2 and is slidable therein, being biased to a lower position by a compression spring 5. The lower end of the plunger is designed to engage the standard cutter actuating mechanism of the forming machine when the attachment is fitted as described to the forming machine. The attachment thus takes the place of the normal cutting assembly with which wire ring forming machines are fitted.

The base plate carries two welding electrodes, a first of which is movable and a second of which is fixed. The second electrode 6 is carried by a support 7 extending cantilever fashion from a raised section 8 at the rear of the base plate 1, so that the electrode 6 lies above the base plate. The support 7 ends in a bifurcated section 9 formed with aligned bores in which is received a pivot pin 10, the pivot pin 10 also passing through a bore in a lug 11 forming an integral part of a clamp 12. The clamp 12 has a face 13 movable into and out of a position adjacent to the frontface of the electrode 6 as the clamp pivots about the pin 10. Pivotal movement of the clamp 12 is effected by a pneumatic ram comprising a cylinder 14 mounted horizontally on the base plate 1 towards the rear thereof, and a piston connected to a piston rod 15 extending forwardly from the cylinder 14. The piston rod 15 includes a length adjustment member 15a and is pivotally connected at 16 to a lever 17 pivotally mounted on the base 1 by a pivot member 18. A rod 19 extending below the electrode 6 has one end pivoted (not shown) to the lever 17 below the support 7, and the other end formed with a clevis and pivoted at 20 to the clamp 12.

When the piston is retracted in the cylinder 14 the clamp 12 is in the position shown in FIG. 1, with the clamping face 13 spaced from the electrode 6. When the piston is extended, this motion is transmitted by the piston rod 15, lever 17 and rod 19 to the clamp 12, to move the clamping face 13 towards the electrode 6. A length of wire passing the electrode 6 will thus be gripped between the clamp 12 and the electrode, the front face of the electrode being formed with a groove 21 in which the wire lies. Lever 17 magnifies the force from the pneumatic ram to give sufficient clamping pressure.

The support 7 has integral bridge and end sections 22 and 23, and carries a mounting block 24. A fixed cutter blade 25 is secured to the mounting block by bolt 26 and secured to a mounting plate 27 by bolts (not shown), the plate 27 in turn being secured to section 23 by bolts 28. The mounting block 24 is secured to the end section by bolts 29, and a further bolt 30 extends through the block 24 and end section 23 to secure the second electrode 6 in place. The lower face of the end section 23 lies above the electrode to leave a space therebetween.

A movable platform 36 is slidably supported on the base plate 1, and is constrained to move towards and away from the second electrode 6 by raised guide sections such as 37 and 38 at the front and rear of the base engaging edges of depending sections of the platform 36. The platform is moved along the base by a double-stroke pneumatic ram comprising a cylinder 39 secured to the base plate 1 and a piston connected to a threaded piston rod 40 passing through a bore in a lug 41 forming an integral part of the platform 36, and secured in the bore by locknuts 42 and 43 one on each side of the lug. Extension of the piston in cylinder 39 moves the platform 36 towards the electrode 6, retraction of the piston moves the platform away from the electrode 6.

An upper-section 36a of the platform 36 carries a housing 45 in which a shaft (not shown) is supported for rotation. One end of the shaft carries releasable axial locking members 46, the other end of the shaft is secured to a frame 47. The frame has secured thereto the first welding electrode 48 which, like the electrode 6 has a groove 49 along the front surface. The frame 47 also comprises two forwardly projecting lugs 50 formed with horizontally aligned bores, a side member 51, an upper member 52 enclosing a circular-section bore 53, and a rearward extension 54.

The upper section 36a of the platform 36 may be adjusted relative to the lower section transversely of the axis of cylinder 39, in order to align the electrodes 48 and 6. It may be locked in position by locknut 44a and a similar locknut (not shown) to the rear of the platform.

Associated with the first electrode 48 is a clamp 55, having a clamping face movable into and out of a position adjacent to the front face of the electrode 48. The clamp 55 is pivoted to the frame 47 by a pivot pin 56 passing through the bores in lugs 50 and through a bore in the clamp 45. The clamp is connected by a pivot pin 57 to a clevis end 58 of a rod 59 passing through the bore 53, and pivotally connected at its other clevis end 60 to a lever 61. One end of the lever 61 is pivoted to the frame 47 about a vertical pivot member 62, and the other end is pivoted to a clevis end 63 of a piston rod 64. The piston rod 64 is connected to a piston of a pneumatic ram also comprising a cylinder 65 mounted on the rearward extension 54 of the frame 47. It will be seen that when the piston is retracted the clamp 55 is in the position shown in FIG. 1, with the clamping face spaced .......................... from the electrode 48. When the piston is extended, this motion is transmitted by the piston rod 64, lever 61 and rod 59 to the clamp 55, to move the clamping face towards the electrode 48. A length of wire lying in the groove 49 of the electrode 48 will thus be gripped between the clamp 55 and the electrode. Lever 61 magnifies the force from the pneumatic ram to give sufficient clamping pressure.

The rearward extension 54 of the frame 47 also has a further double-stroke cylinder 66 secured thereto by way of studs and nuts 67, this cylinder having its axis vertically disposed. This cylinder is one element of a pneumatic ram also having a piston connected to a piston rod 68 having a threaded end received in a threaded socket 69 secured to the platform 36 for rotation about a pivot pin 69a. This threaded connection allows the piston rod to be adjusted relative to the platform, and the piston can be locked in a set position by a locknut 70. FIG. 1 shows the apparatus with the piston part-extended in cylinder 66. In the full-extended condition the groove on first electrode 48 is horizontally aligned with the groove on second electrode 6. Movement of the first electrode below the second electrode is prevented by a stop screw 71 engaging a stop member 72 on the platform 36a. The stop screw 71 is received in a threaded bore in side member 51 of frame 47 and is held in a desired position of adjustment by locknut 72a.

On operation of cylinder 66 so that the piston takes up a part-extended position, the frame 47 pivots about the axis of the shaft of housing 45 so that the first electrode 48 lies with its groove above that of electrode 6 and aligned with the space between electrode 6 and the lower face of the mounting block 24. Operation of cylinder 66 allowing full retraction of the piston allows the frame 47 to pivot further about the axis of the shaft of housing 45 so that the first electrode 48 is raised to an even higher position above the electrode 6. The dead weight of the cylinders 65 and 66, their associated pistons, and part of the frame 47 combine to provide a biasing force tending to rotate the frame about the axis of the shaft of housing 45 to lift the electrode 48 to its uppermost position.

The fixed cutter blade 25 is designed to co-operate with a movable cutter blade 73 carried at the upper end of the plunger 4 and shielded by a guard 74. The movable cutter blade is driven from the ring forming machine between three positions. The first of these is the withdrawn position shown in FIGS. 1 and 3 wherein the movable cutter blade lies below the second electrode 6. In the intermediate position the cutter blade closes off the end of the groove 21 on the front surface of the electrode 6, but lies below the wire forming the ring. In the cutting position the movable cutter blade 73 is raised from the intermediate position and co-operates with the fixed cutter blade 25 to cut the wire.

In order that the two welding electrodes 6 and 48 are electrically separate, insulation means are provided. The bore through the housing 45 is therefore lined with a sleeve of insulating material. The threaded socket 69 is of insulating material, and so is the stop member 72. Accordingly the frame 47 is fully insulated from the platform 36 and base plate 1. One electrical connection to the welding circuit is thus made from frame 47, and the other from the support 7. One of the controls for the welding circuit is a microswitch 75 having an operating member 76 which is operated to close the switch by contact with a projection 77 from frame 47 when this is in the position wherein the groove on electrode 48 is aligned with the groove on electrode 6.

Figure 2:
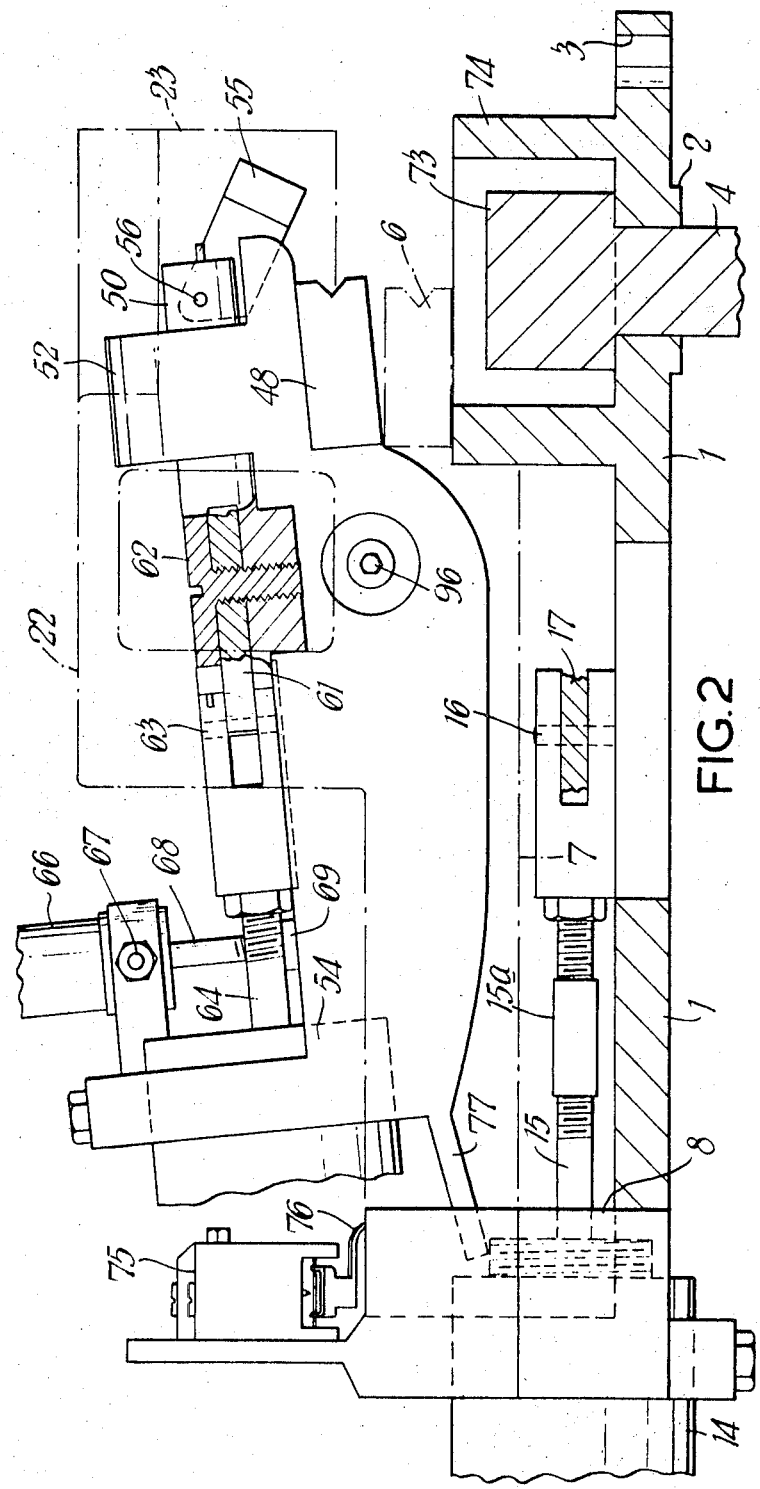
FIG. 2 is a section on the line II—II of FIG. 1 with some parts removed and other parts broken away for clarity.

In connection with the view shown in FIG. 2 it should be mentioned that the figure is intended to show primarily the side elevation of the frame 47. For the sake of clarity the platform 36 and other parts mounted on the base 1 are omitted. Further, to assist in relating the position of the frame 47 to the fixed electrode 6, the electrode and the support 7 therefor are shown in outline in broken lines in FIG. 2.

Referring now to FIG. 3 this shows part of a wire ring forming machine of known construction, with the welding head of the invention mounted thereon. The forming machine comprises a mounting plate 78 from which three shafts 79, 80 and 81 depend, each shaft having a roller 82, 83 and 84 respectively rotatably mounted at its lower end. Shaft 79 is adjustable in slot 85, and may be locked in position by a nut 86. Shafts 80 and 81 are both threaded and pass through slots in the mounting plate and through tapped holes in slide blocks 87 and 88 respectively. The height of the rollers 83 and 84 may thus be adjusted, and the rollers may be held at a set height by locknuts 89 and 90 respectively. Each slide block is adjustable relative to the mounting plate 78 by an identical adjusting mechanism. For example slide block 87 is formed with a slot 91 through which a bolt passes and threads into a tapped bore in the mounting plate 78. With the bolt tightened the slide block is locked in plate. With the bolt loose the block may be moved along a slideway 92 by rotation of an adjusting screw 93 having a knurled end section 94. The screw 93 passes freely through a bore, through a side element 94a of the mounting plate 78, and is received in a tapped bore in the end of slide block 87.

The three rollers 82, 83 and 84 may thus be adjusted to different relative positions according to the diameter of wire ring required. FIG. 3 shows a length of wire 95 passing through the rollers and being formed to a ring shape. The wire leaving the roller 84 passes to the groove of the first welding electrode 48. As shown the free end of the wire forming the ring then travels in a part-helical path to arrive in the groove in the front face of the first electrode 6.

Operation of the attachment in conjunction with a ring forming machine as shown in FIG. 3 will now be described. Prior to formation of a ring the piston in cylinder 39 is fully retracted so that the first electrode 48 is spaced from the second electrode 6. The piston in cylinder 66 is part-retracted so that the electrode 48 lies above the level of electrode 6 as shown in FIGS. 1 and 3. The movable cutter blade 73 is set in its withdrawn position below the electrode 6. The pistons in cylinders 14 and 65 are retracted so that the clamps 12 and 55 are open. The projection 77 of frame 47 does not contact the microswitch lever 76, so that the welding current circuit is open.

To form the wire ring the wire forming machine is operated in conventional manner to feed wire 95 through rollers 82, 83 and 84, the wire running over the groove of the first electrode 48 and the leading end of the wire eventually passing to the groove of the second electrode 6. During formation of the ring the movable cutter blade 73 is raised to its intermediate position by known mechanism of the wire forming machine. In this intermediate position the blade 73 lies across the end of the groove 21 of electrode 6. Feed of wire continues until the leading end of the wire contacts the cutter blade 73, when feed is stopped. The pistons in cylinders 14 and 65 are then extended to operate the clamps 12 and 55. Clamp 12 clamps the free end of the wire to the electrode 6; clamp 55 clamps the length of wire lying in groove 49 to electrode 48. The movable cutter blade 73 is then raised to its cutting position, and the wire is cut by the blades 73 and 25. During cutting the piston in cylinder 66 is allowed to retract fully so that the frame 47 pivots about the axis 96 (FIG. 2) of the shaft supported in the housing 45. Thus, the first electrode 48 and clamp 55 are allowed to move freely upward with the wire during cutting, to the position shown in FIG. 2.

After cutting, the movable cutter blade 73 is moved back to its withdrawn position. The piston in cylinder 39 is retracted slightly to move the cut end of the wire gripped in electrode 48 clear of the end gripped in electrode 6. The piston in cylinder 66 is then fully retracted to pivot the frame 47 about the axis 96, until the stop screw 71 engages the stop member 72. The grooves in electrodes 6 and 48 are then aligned, and thus the cut end and the free end of the wire 95 are aligned. The projection 77 contacts the operating member 76 of microswitch 75, which closes to operate a relay controlling the welding circuit. The piston in cylinder 39 is part extended to bring the cut end and free end of the wire close together. Cylinder 39 then applies welding pressure to the butted ends of the wire and normal butt welding takes place during a timed weld period.

After completion of the weld the pistons in cylinders 14 and 65 are retracted and the completed ring falls from the machine, being directed to a receptacle by a plate 97 or by other suitable extracting mechanism. The piston in cylinder 39 is fully retracted to move the electrodes to their position of greatest separation. The piston in cylinder 66 is moved to its semi-extended position. Feed of wire can be resumed to form a further ring.

It will be appreciated that operation of the cylinders and the cutter can be performed in the correct order by any one of a number of different timing control arrangements, all of which may involve conventional electrical and pneumatic circuitry. The control arrangement can also regulate the time of the welding operation.

Wire ring forming machines are usually run continuously there being a pause in wire feed for cutting to take place. The invention does of course, call for an increased dwell period to allow welding to be carried out and the conventional forming machine is modified by the addition of suitable circuitry linked mechanically or electrically to the welding attachment. Thus, modifications must be made whereby the normal cycle of the machine must stop as the cutter operating plate starts its cutting movement. This takes place at the same time as the free end of wire contacts the movable cutter blade, and the movement of the cutter operating plate can be used to close a microswitch to start the timing control of the welding attachment. The timing control includes control allowing full operation of the cutter operating plate to move the blade 73 to effect cutting of the wire, and also allows the forming machine to restart when the welding operation is complete, and all the components returned to their starting condition.

It will be appreciated that many modifications may be made to the attachment as described. The control cylinders may be hydraulic rather than pneumatic, and the hydraulic pressure available may be sufficient to operate the clamps directly without an intermediate lever system. Means may be provided for cooling the welding electrodes, and these will preferably be a ducting system for water cooling of the electrodes.

The movable cutter blade need not be operated from the forming machine by mechanical means, but may, if required, be operated by a hydro-pneumatic or other suitable system.

A wire ring forming machine may be built with welding equipment similar to that described as an original fitting, in which case the control gear for both the forming and welding operations will be integrated.

The invention presents a method and apparatus for manufacturing wire rings, eliminating any intermediate handling step between forming and welding.

We claim:

1. Apparatus for manufacturing wire rings, comprising: a first welding electrode; a second welding electrode located adjacent to said first welding electrode; first clamping means operatively associated with said first welding electrode to releasably clamp wire thereto; second clamping means operatively associated with said second welding electrode to releasably clamp wire thereto; driving means operatively connected to at least one of said welding electrodes for causing relative movement of said welding electrodes between positions wherein the axes of those sections of the wire when clamped to said welding electrodes are not aligned and a welding position wherein said axes are substantially aligned; and cutter means operative to cut said wire between said welding electrodes.

2. Apparatus as claimed in claim 1 wherein each of said first and second welding electrodes has a front surface with a horizontal groove formed therein for receiving said wire; said second welding electrode is fixed; and said driving means is operatively connected to said first welding electrode to move said first welding electrode between said welding position wherein said grooves on said welding electrodes are in alignment and positions wherein said groove on said first welding electrode lies above said groove on said second welding electrode.

3. Apparatus as claimed in claim 2 wherein said cutter means comprises a fixed cutter blade; means mounting said fixed cutter blade above said second welding electrode; a movable cutter blade; and guide means for guiding said movable cutter blade between a withdrawn position below said welding electrodes and a cutting position wherein said movable cutter blade co-operates with said fixed cutter blade to cut said wire.

4. Apparatus as claimed in claim 3 and including stop means for stopping movement of said movable cutter blade at an intermediate position between said withdrawn position and said cutting position, said movable cutter blade when in said intermediate position lying across an end of said groove in said front surface of said second welding electrode to arrest a free end of wire being 5. Apparatus as claimed in claim 4 and further including a frame; mounting means mounting said first welding electrode on said frame; pivotal mounting means mounting said frame for pivotal movement about a horizontal axis; a first pneumatic ram; means mounting said first pneumatic ram whereby extension and retraction of said ram causes pivotal movement of said frame; first locating means for locating said frame in a position wherein said first welding electrode lies in said welding position; second locating means for locating said frame in a position wherein said first welding electrode lies in an intermediate position wherein said groove in said front face of said first welding electrode lies above said groove in said front face of said second welding electrode; said second locating means being releasable to allow said frame to be moved so that said first welding electrode moves upwardly from said intermediate position with said wire as said movable cutter blade moves to said cutting position to cut said wire.

6. Apparatus as claimed in claim 5 and further comprising a second pneumatic ram; means mounting said second pneumatic ram on said frame; and linkage means connected to said second pneumatic ram and to said first clamping means whereby operation of said second pneumatic ram operates said first clamping means.

7. Apparatus as claimed in claim 6 and including a platform on which said frame is pivotally mounted; a base; means mounting said platform for sliding movement on said base in a direction such that said first welding electrode may be moved towards and away from said second welding electrode; and a third pneumatic ram operatively connected to said platform to effect said sliding movement thereof.

8. Apparatus as claimed in claim 7 and including electrical insulating means insulating said frame from said platform.

9. Apparatus according to claim 1 and further comprising a fourth pneumatic ram and linkage means connected to said fourth pneumatic ram and to said second clamping means whereby operation of said fourth pneumatic ram operates said second clamping means.

* * * * *